United States Patent
Furukawa et al.

(10) Patent No.: US 10,460,449 B2
(45) Date of Patent: Oct. 29, 2019

(54) IMAGE PROCESSING APPARATUS, IMAGE PROCESSING METHOD, AND IMAGE PROCESSING SYSTEM FOR EXTRACTING REGIONS OF INTEREST

(71) Applicant: CANON KABUSHIKI KAISHA, Tokyo (JP)

(72) Inventors: Daisuke Furukawa, Tokyo (JP); Keita Nakagomi, Kyoto (JP); Bin Chen, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 318 days.

(21) Appl. No.: 15/427,318

(22) Filed: Feb. 8, 2017

(65) Prior Publication Data
US 2017/0256062 A1    Sep. 7, 2017

(30) Foreign Application Priority Data

Mar. 7, 2016 (JP) ................... 2016-043929

(51) Int. Cl.
| | | |
|---|---|---|
| G06K 9/62 | (2006.01) | |
| G06T 7/162 | (2017.01) | |
| G06T 7/187 | (2017.01) | |
| G06T 7/194 | (2017.01) | |
| G06T 7/11 | (2017.01) | |
| G06K 9/34 | (2006.01) | |
| G06T 3/40 | (2006.01) | |

(52) U.S. Cl.
CPC ............. *G06T 7/162* (2017.01); *G06K 9/342* (2013.01); *G06K 9/6224* (2013.01); *G06T 3/40* (2013.01); *G06T 7/11* (2017.01); *G06T 7/187* (2017.01); *G06T 7/194* (2017.01); *G06T 2207/10024* (2013.01); *G06T 2207/10072* (2013.01)

(58) Field of Classification Search
CPC ........ G06K 9/342; G06K 9/6224; G06T 3/40; G06T 7/11; G06T 7/162; G06T 7/187; G06T 2207/10024; G06T 2207/10072
See application file for complete search history.

(56) References Cited

U.S. PATENT DOCUMENTS

| 6,973,212 B2 | 12/2005 | Boykov et al. |
| 2007/0165949 A1 | 7/2007 | Sinop et al. |

(Continued)

FOREIGN PATENT DOCUMENTS

| JP | 2013-156094 A | 8/2013 |
| WO | 2013/155358 A1 | 10/2013 |

OTHER PUBLICATIONS

Drechsler et al.("Automatic ROI identification for fast liver tumor segmentation using graph-cuts," Proc. SPIE. 7962, Medical Imaging 2011: Image Processing, Mar. 14, 2011) (Year: 2011).*

(Continued)

*Primary Examiner* — Yubin Hung
(74) *Attorney, Agent, or Firm* — Venable LLP

(57) ABSTRACT

An image processing apparatus comprises generating unit configured to generate a second image by changing a size of a first image such that a region of interest in the second image satisfies a predetermined criterion about a dimension; and extracting unit configured to extract the region of interest from the second image generated by the generating unit, by applying a Graph-Cut method using a Graph-Cut coefficient corresponding to the criterion to the second image.

15 Claims, 7 Drawing Sheets

(56) References Cited

U.S. PATENT DOCUMENTS

| | | | |
|---|---|---|---|
| 2011/0026794 A1* | 2/2011 | Sundar | G06K 9/44 |
| | | | 382/131 |
| 2015/0078641 A1* | 3/2015 | Tan | G06T 7/0012 |
| | | | 382/131 |
| 2015/0117750 A1 | 4/2015 | Minato et al. | |
| 2015/0272467 A1* | 10/2015 | Warfield | A61B 5/055 |
| | | | 382/131 |
| 2015/0294082 A1* | 10/2015 | Passerini | G16H 50/50 |
| | | | 703/11 |
| 2017/0116741 A1* | 4/2017 | Gu | G11B 27/031 |
| 2017/0337693 A1* | 11/2017 | Baruch | G06T 7/168 |

OTHER PUBLICATIONS

Boykov et al. ("Fast Approximate Energy Minimization Via Graph Cuts," IEEE Transactions on Pattern Analysis and Machine Intelligence, vol. 23 , Issue: 11 , Nov. 2001) (Year: 2001).*

Johannes Feulner, et al, "Lymph node detection and segmentation in chest CT data using discriminative learning and a spatial prior", Medical Image Analysis, vol. 17, No. 2, Feb. 2013 (Feb. 2013), pp. 254-270, XP055377849, GB, ISSN: 1361-8415, DOI: 10.1016/j.media.2012.11.001.

European Search Report dated Jun. 16, 2017 in European Application No. 17000191.1.

U.S. Appl. No. 15/217,302, filed Jul. 22, 2016. Applicants: Bin Chen, et al.

* cited by examiner

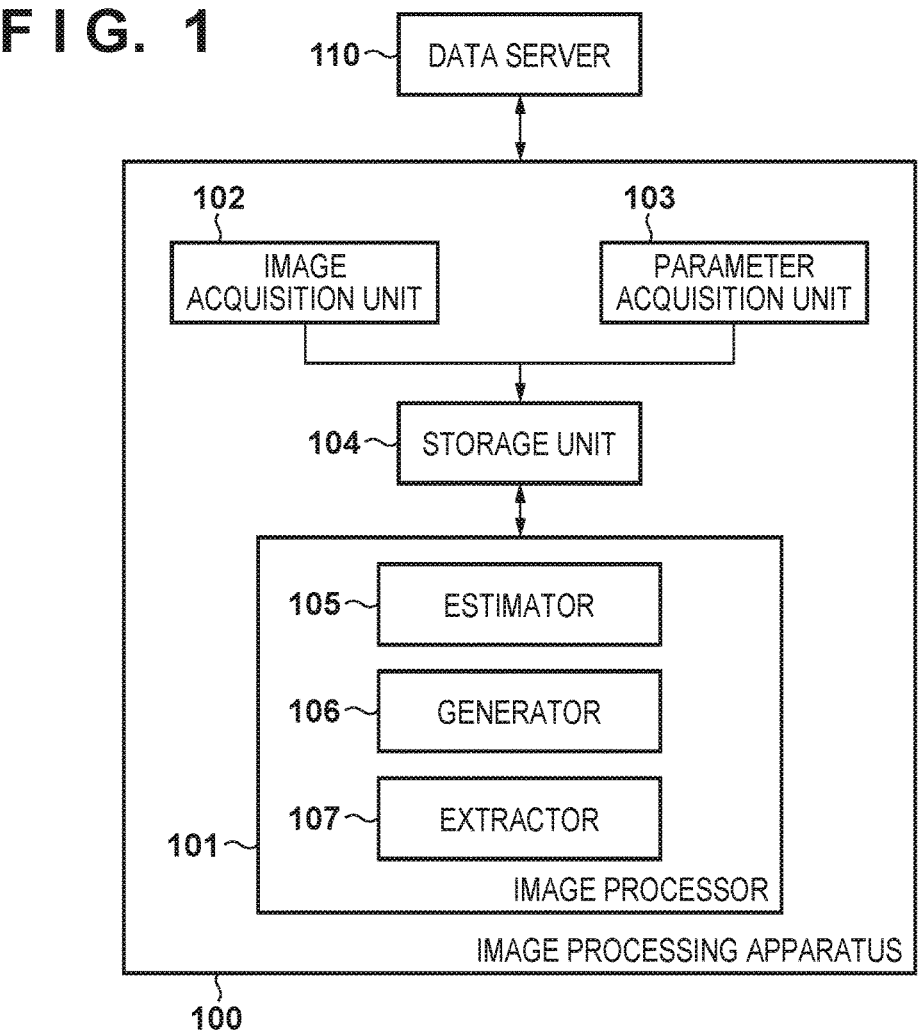
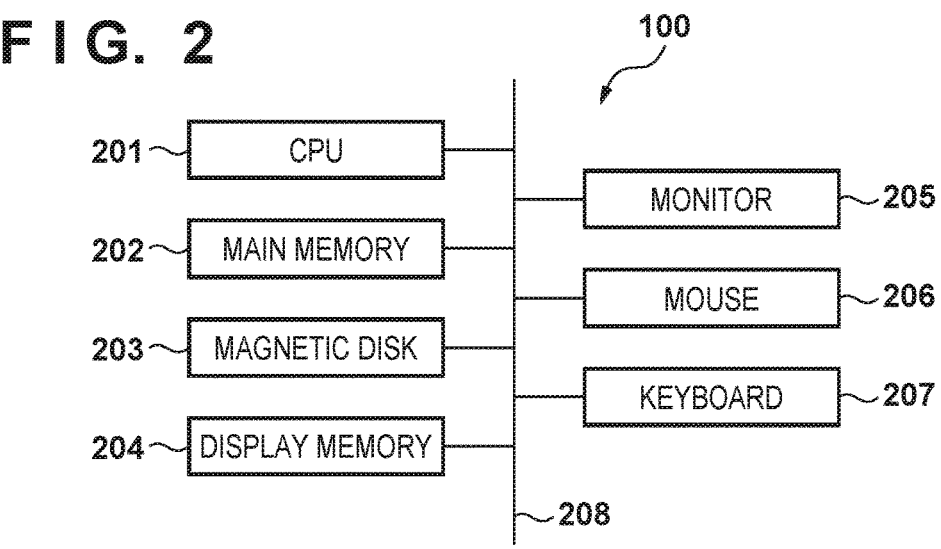

IMAGE PROCESSING APPARATUS, IMAGE PROCESSING METHOD, AND IMAGE PROCESSING SYSTEM FOR EXTRACTING REGIONS OF INTEREST

BACKGROUND OF THE INVENTION

Field of the Invention

This disclosure relates to an image processing apparatus, image processing method, and image processing system.

Description of the Related Art

One important technique of image processing techniques is image segmentation. Image segmentation is a process of distinguishing a region of interest existing in an image from other regions. Many segmentation methods have been proposed, and a new segmentation method called a Graph-Cut method is recently attracting attention (U.S. Pat. No. 6,973,212). In this Graph-Cut method described in U.S. Pat. No. 6,973,212, an energy function is defined by a linear sum obtained by weighting two energy terms called a data term and smoothing term by a constant. A graph is formed in accordance with this energy function definition, and the formed graph is cut by using a minimum-cut/maximum-flow algorithm. Then, a region of interest in an image is acquired based on the cut graph.

Extraction of a plurality of regions of interest will be explained below. Generally, different regions of interest have different shapes and different dimensions. For example, when extracting a region of a pulmonary nodule from a chest CT image obtained by an X-ray CT apparatus, the shape and dimension of a pulmonary nodule change from one subject to another and from one portion to another in a pulmonary area. That is, even when the types (for example, pulmonary nodules) of regions of interest are the same, different regions of interest naturally have different shapes and different dimensions.

When regions of interest existing in an image have different shapes and different dimensions, the ratios of the regions of interest in the image and the ranges (the circumferential lengths of the regions of interest in a two-dimensional image, and the surface areas in a three-dimensional image) of boundaries between the regions of interest and peripheral regions are different. In the energy function of the Graph-Cut method, the value of the data term generally changes in proportion to the dimension of a region of interest. On the other hand, the value of the smoothing term generally changes in proportion to the square of the dimension of a region of interest. Also, even when the dimension of a region of interest remains the same, if the shape of the region of interest changes, the value of the smoothing term changes. In regions of interest different in shape and dimension, therefore, the ratio of the data term value to the smoothing term value changes.

When using a predetermined constant as a coefficient by which the data term or smoothing term is multiplied as described in U.S. Pat. No. 6,973,212, the ratio of the influence from the data term to the influence from the smoothing term largely changes from one region of interest to another. Accordingly, it may be impossible to properly extract a region of interest having a shape and dimension different from those when the constant is determined (that is, as expected when the constant is determined).

Japanese Patent Laid-Open No. 2013-156094 has disclosed a technique of extracting a region of interest having a desired dimension by the Graph-Cut method by designating an expected value of the dimension of the region by an operator. In this disclosed technique, however, an operator must designate an expected value of the dimension of each region of interest, and this increases the load on the operator.

SUMMARY OF THE INVENTION

An aspect of this disclosure includes the following arrangement.

An image processing apparatus, comprising: generating unit configured to generate a second image by changing a size of a first image such that a region of interest in the second image satisfies a predetermined criterion about a dimension; and extracting unit configured to extract the region of interest from the second image generated by the generating unit, by applying a Graph-Cut method using a Graph-Cut coefficient corresponding to the criterion to the second image.

This makes it possible to obtain a high-accuracy region extraction result regardless of the shape and dimension of a region of interest while reducing the load on an operator.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIG. 1 is a view showing the functional configuration of an image processing apparatus according to the first embodiment;

FIG. 2 is a view showing an example of the hardware configuration of the image processing apparatus according to the first embodiment;

DESCRIPTION OF THE EMBODIMENTS

Figure 3:
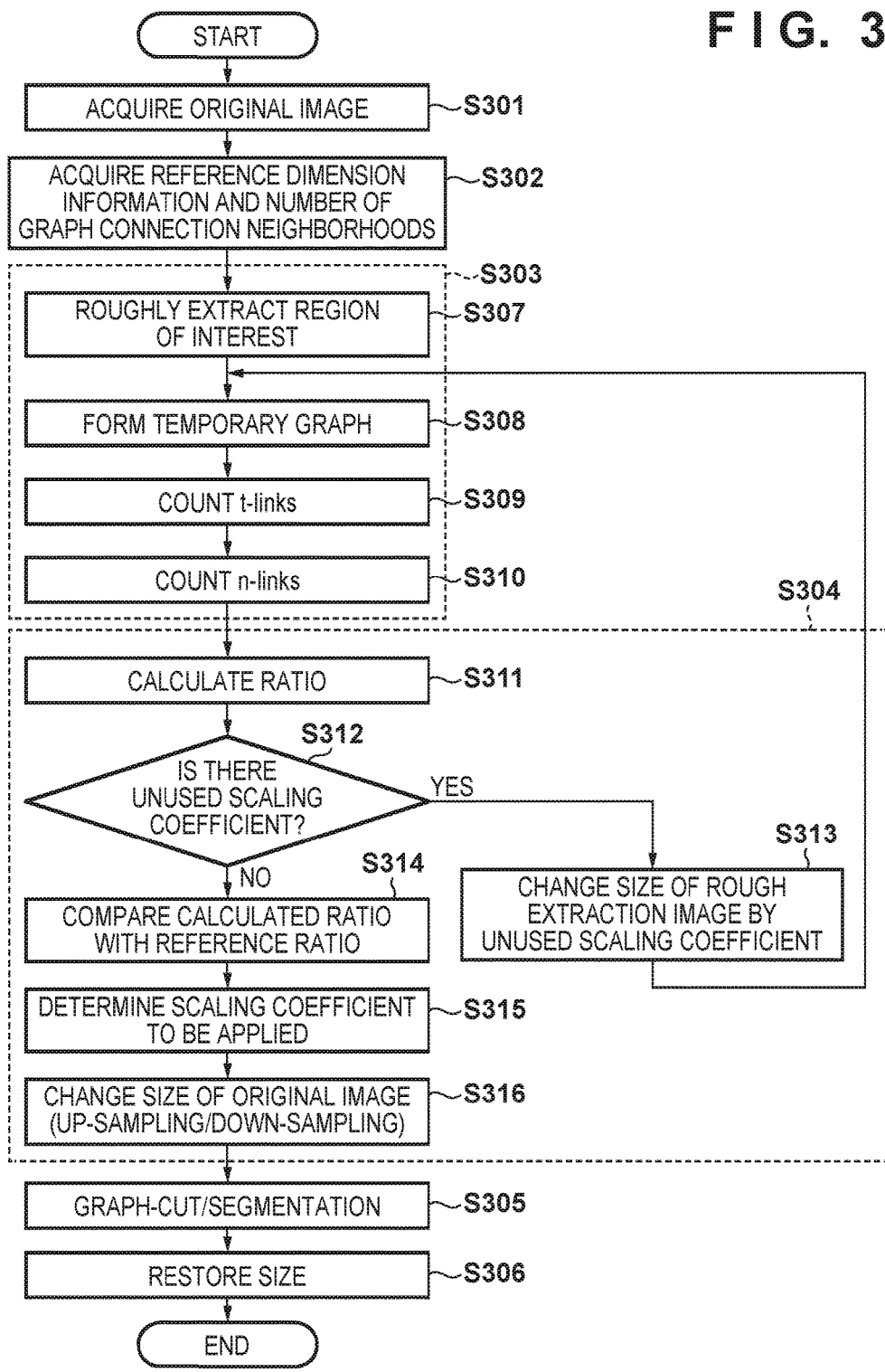
FIG. 3 is a flowchart showing the procedure of the image processing apparatus according to the first embodiment.

Embodiments of this disclosure will be explained below with reference to the accompanying drawings. However, embodiments of this disclosure are not limited to the following embodiments. The same reference numerals denote the same or almost the same constituent elements, members, and processes shown in the drawings, and a repetitive explanation will appropriately be omitted. Also, some members not important for explanation will be omitted from each drawing.

In the following embodiments, examples of processing medical images obtained by various apparatuses for use in image diagnoses, such as an X-ray computed tomography apparatus (X-ray CT), magnetic resonance imaging apparatus (MRI), and ultrasonic image diagnosing apparatus will be described. However, the application range of this disclosure is not limited to medical images, and this disclosure is also applicable to images obtained by a camera and video camera. Also, this disclosure is equally applicable to a two-dimensional image, three-dimensional image, and time-series image as well.

First Embodiment

An image processing apparatus according to the first embodiment reads out an image (to be referred to as an original image hereinafter) designated by an operator, roughly extracts a region of interest existing in this original image by the segmentation method different from the Graph-Cut method, and acquires information (to be referred to as dimension information hereinafter) about the dimension of the extracted region. This dimension information contains information related to the dimension (the area in a two-dimensional image, and the volume in a three-dimensional image) of the region of interest itself, and information related to the range (the circumferential length in a two-dimensional image, and the surface area in a three-dimensional image) of the boundary between the region of interest and its peripheral region. These pieces of related information represent a rough dimension of the region of interest. The image size of the original image is changed based on this dimension information. The region of interest existing in the image having the changed image size (to be referred to as a size-changed image hereinafter) is acquired by applying the Graph-Cut method to the size-changed image.

The functional configuration of an image processing apparatus 100 according to the first embodiment will be explained below with reference to FIG. 1. The image processing apparatus 100 includes an image processor 101, an image acquisition unit 102, a parameter acquisition unit 103, and a storage unit 104. The image processor 101 includes an estimator 105, a generator 106, and an extractor 107. The image processing apparatus 100 is connected to a data server 110 across a network such as the Internet or a LAN. The data server 110 stores data to be input to the image processing apparatus 100, and data to be output from the image processing apparatus 100.

The image acquisition unit 102 acquires an original image from the data server 110, and stores the acquired original image in the storage unit 104.

The parameter acquisition unit 103 acquires a plurality of parameters from the data server 110, and stores the acquired parameters in the storage unit 104. These parameters acquired by the parameter acquisition unit 103 include the number of connection neighborhoods of a graph, and reference dimension information (reference information). The number of connection neighborhoods of a graph is a parameter which defines a set of nodes to be connected by edges in a graph formed by the Graph-Cut method. The reference dimension information is information indicating the target dimension of size change when the generator 106 changes the image size of an original image. The reference dimension information contains information like the dimension information of the region of interest. That is, the reference dimension information contains an amount defined by the dimension of a region preset as a region of interest as a reference (a reference region of interest), and by the range of the boundary between this region and its peripheral region. The reference dimension information further contains information about a Graph-Cut coefficient. The Graph-Cut coefficient is a coefficient α by which a smoothing term $E_2(p, q)$ is multiplied in an energy function E of the Graph-Cut method defined by:

$$E = \sum_{P \in Node} E_1(p) + \alpha \times \sum_{(p,q) \in Edge} E_2(p, q) \quad (1)$$

where p and q are indices representing pixels in the image, and $E_1(p)$ is a data term. In the energy function assumed in this embodiment, the smoothing term is multiplied by the coefficient α. However, this embodiment is also applicable to an energy function in which the data term is multiplied by the coefficient α.

The estimator 105 acquires the original image and the number of connection neighborhoods of the graph from the storage unit 104. Then, the estimator 105 estimates the dimension information of the region of interest existing in the original image. After this estimation of the dimension information of the region of interest, the estimator 105 stores the estimated dimension information in the storage unit 104.

The generator 106 generates a size-changed image (a second image) obtained by changing the size of the original image (a first image), so that the estimation result of the dimension of the region of interest in the size-changed image satisfies a predetermined criterion. The generator 106 acquires the original image, the reference dimension information, and the dimension information of the region of interest from the storage unit 104. After that, the generator 106 calculates a scaling coefficient based on the acquired reference dimension information and region-of-interest dimension information. When two images are given, the scaling coefficient is a numerical value defined by the ratio of the number of pixels on one side of one image to the number of pixels on one side of the other image. The scaling coefficient is a change rule when changing one of two images into the other. Based on this scaling coefficient, the generator 106 changes the image size of the original image acquired from the storage unit 104, thereby generating a size-changed image. Finally, the generator 106 stores the size-changed image in the storage unit 104.

Also, the generator 106 changes the image size of an image (an extraction image corresponding to the size-changed image) generated by the extractor 107 (to be described later), thereby generating an image (an extraction image corresponding to the original image) having the same image size as that of the original image. The generated image is stored in the data server 110 via the storage unit 104.

The extractor 107 extracts the region of interest from the size-changed image generated by the generator 106, by applying the Graph-Cut method using the Graph-Cut coefficient corresponding to the criterion to the size-changed image. The extractor 107 acquires the size-changed image from the storage unit 104, and extracts the region of interest contained in the size-changed image by using the Graph-Cut method. This image (the extraction image corresponding to the size-changed image) obtained by the Graph-Cut method is stored in the storage unit 104.

The data server 110 stores the original image, the number of connection neighborhoods of the graph, and the predetermined reference dimension information. In accordance with a request from the image processing apparatus 100, the data server 110 transmits data stored in it to the image processing apparatus 100. In addition, the data server 110 receives data transmitted from the image processing apparatus 100, and stores the transmitted data.

Note that at least one of the functional units of the image processing apparatus 100 shown in FIG. 1 may be implemented by an independent apparatus, and may also be implemented by software which implements the function. In this embodiment, each unit is implemented by software. An example of hardware for implementing each functional unit of the above-described image processing apparatus 100 by software will be explained below.

FIG. 2 is a view showing an example of the hardware configuration of the image processing apparatus 100 according to the first embodiment. A CPU 201 mainly controls the operation of each constituent element. A main memory 202 stores a control program to be executed by the CPU 201, and provides a work area when the CPU 201 executes the program. A magnetic disk 203 is an example of an external memory for storing an operating system (OS), device drivers of peripheral devices, and programs for implementing various kinds of application software including programs for performing processes to be described later and the like. The storage unit 104 is implemented by the magnetic disk 203. The CPU 201 implements the functions (software) of the image processing apparatus 100 shown in FIG. 1 and processes in flowcharts to be described later, by executing the programs stored in the main memory 202 and magnetic disk 203. Note that the programs stored in the magnetic disk 203 are expanded in the main memory 202 as needed, and executed by the CPU 201.

A display memory 204 temporarily stores display data. A monitor 205 is a CRT monitor, liquid-crystal monitor, or the like, and displays images, texts, and the like based on data from the display memory 204. A mouse 206 and a keyboard 207 are respectively used in pointing input and character input by the user. The above-mentioned constituent elements are connected by a common bus 208 so as to be communicable with each other.

This example shown in FIG. 2 shows only one CPU 201 as hardware, but the apparatus may also include a plurality of CPUs or a GPU. In either case, the apparatus can include a plurality of units of arithmetic processing devices (processors) such as CPUs or GPUs as hardware resources. Also, the apparatus can include a plurality of magnetic disks 203 for storing programs.

In another embodiment, at least some or all of the functions of the estimator 105, generator 106, and extractor 107 can be implemented by one or a plurality of dedicated hardware circuits.

Next, the procedure of the image processing apparatus 100 of this embodiment will be explained with reference to FIG. 3.

In step S301, the image acquisition unit 102 acquires an original image from the data server 110, and stores the acquired original image in the storage unit 104.

In step S302, the parameter acquisition unit 103 acquires reference dimension information and the number Nc of graph connection neighborhoods from the data server 110, and stores the acquired information in the storage unit 104.

In step S303, the estimator 105 acquires the original image from the storage unit 104. Then, the estimator 105 estimates dimension information of a region of interest existing in the original image. The estimated region-of-interest dimension information is stored in the storage unit 104. In step S303, the estimator 105 also estimates dimension information of a region of interest existing in a rough extraction image generated in step S304 (to be described later). Details of the process of this step will be described later.

In step S304, the generator 106 acquires the original image and the dimension information of the region of interest from the storage unit 104. Then, the generator 106 changes the image size of the original image based on the dimension information of the region of interest, thereby generating a size-changed image. Finally, the generator 106 stores the generated size-changed image in the storage unit 104. Details of the process of this step will be described later.

In step S305, the extractor 107 acquires the number of graph connection neighborhoods, a Graph-Cut coefficient, and the size-changed image from the storage unit 104. After that, the extractor 107 applies the Graph-Cut method described in, for example, U.S. Pat. No. 6,973,212 to the size-changed image by using the number of graph connection neighborhoods and Graph-Cut coefficient. This image (an extraction image corresponding to the size-changed image) generated by the Graph-Cut method is stored in the storage unit 104.

In step S306, the generator 106 acquires the extraction image corresponding to the size-changed image from the storage unit 104. Then, the generator 106 generates an image (an extraction image corresponding to the original image) having the same image size as that of the original image, by changing the image size of the acquired image. As a result of this process, the region of interest existing in the original image can be acquired. The extraction image corresponding to the original image is stored in the data server 110 via the storage unit 104.

The process in step S303 of this embodiment will be explained below with reference to FIGS. 3 and 4A to 4D. FIGS. 4A to 4D explain the process in step S303 by using a two-dimensional gray-scale image having seven pixels on each side as the original image.

Figure 4A:
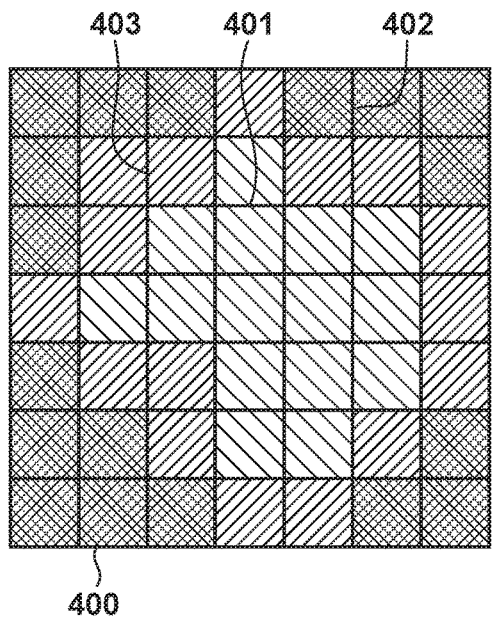
FIGS. 4A, 4B, 4C, and 4D are schematic views for explaining processing of the image processing apparatus according to the first embodiment.

In step S307, the estimator 105 roughly extracts the region of interest contained in the original image. FIG. 4A shows an original image 400 as a gray-scale image having seven pixels on each side. In the original image 400, a region of interest 401 is drawn by a light color, and other regions 402 are drawn by a dark color. Since the original image 400 is a gray-scale image, the concentration value of the image smoothly changes in pixels existing between the region of interest 401 and the other regions 402. Referring to FIG. 4A, pixels 403 are pixels in which the concentration value smoothly changes between the region of interest 401 and the other regions 402.

In step S307, the region of interest is roughly extracted by using a well-known segmentation method different from the Graph-Cut method. Of well-known segmentation methods, the easiest method is a thresholding process for an image gray-scale value. This method is effective when the concentration value of an image contained in a region of interest is known, and a region having the same concentration value as the known concentration value does not exist except the region of interest. As a method other than this thresholding process, it is also possible to use a region extension method or level set method. When using these methods, the image processing apparatus 100 shows an original image to an operator, and encourages the operator to designate a point or small region contained in a region of interest. Instead of these methods, it is also possible to use MAP (Maximum Posterior Probability) using the spatial existence probabilistic atlas of a region of interest.

Figure 4B:
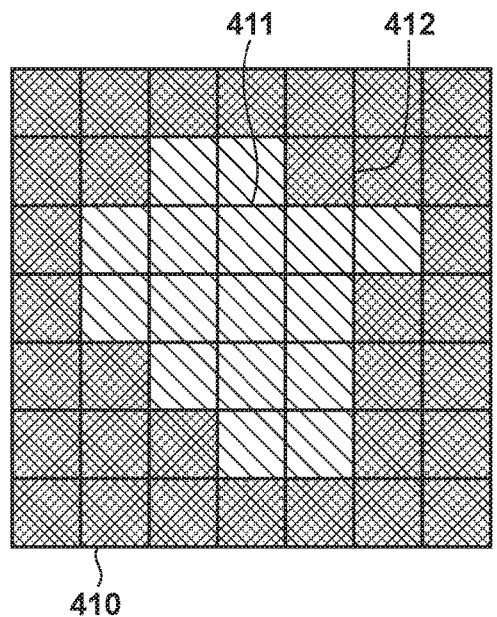

The image obtained in step S307 will be referred to as a rough extraction image 410 hereinafter. Also, a region extracted as a region of interest by the well-known segmentation method from pixels in the rough extraction image 410 will be referred to as a rough extraction region 411. In addition, a region not extracted as the region of interest will be referred to as a background region 412. FIG. 4B shows the rough extraction region 411 by a light color on the rough extraction image 410. Comparison of the region of interest 401 with the rough extraction region 411 reveals that some pixels are sometimes extracted as the region of interest by mistake, and it is sometimes determined by mistake that the region of interest is the background region. However, it is generally known that the rough extraction region 411 roughly matches the region of interest 401.

Figure 5A:
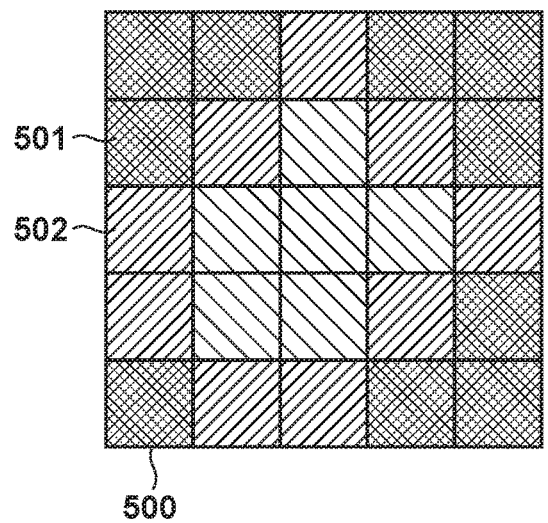
FIGS. 5A and 5B are schematic views for explaining a graph in the Graph-Cut method.
Figure 5B:
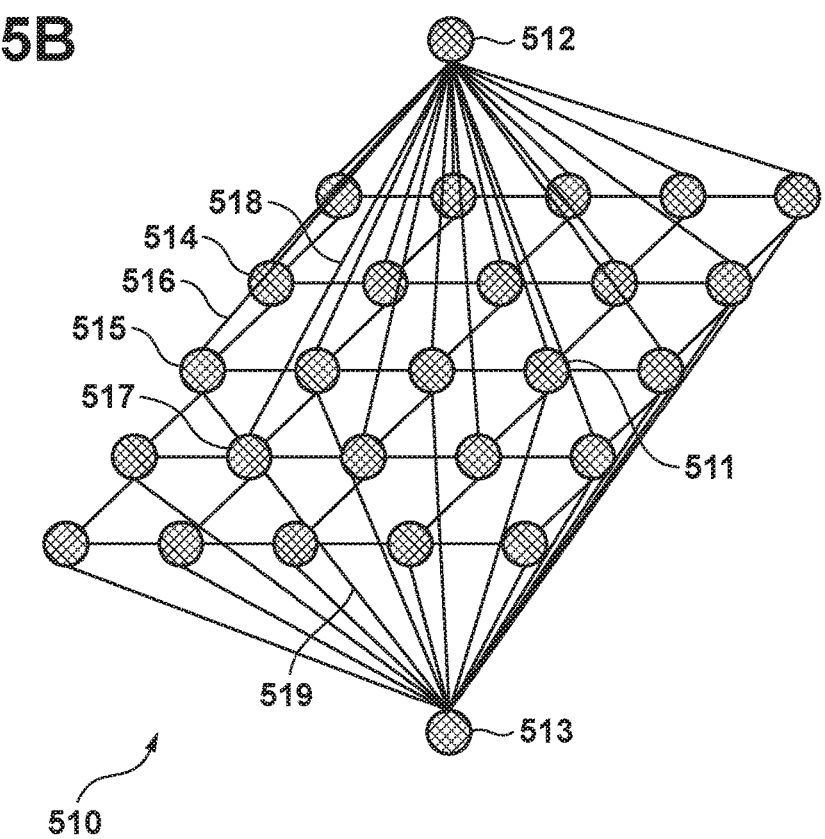

In step S308, the estimator 105 forms the following graph (to be referred to as a temporary graph hereinafter) from the rough extraction image obtained in step S307 or step S313 (to be described later). This temporary graph has the same properties as those of a graph generated by the Graph-Cut method. Therefore, the graph of the Graph-Cut method will be explained with reference to FIGS. 5A and 5B by limiting the explanation to items necessary to understand this embodiment. In FIGS. 5A and 5B, the graph will be explained by using a two-dimensional image 500 having five pixels on each side, and a corresponding graph 510, in order to facilitate understanding these drawings.

The graph 510 generated by the Graph-Cut method has image nodes in one-to-one correspondence with the pixels of the image 500, or has image nodes each of which corresponds to a plurality of adjacent pixels in the image. Furthermore, the graph 510 has terminal nodes 512 and 513 corresponding to the foreground ravel and background ravel of a region. A plurality of adjacent image nodes are connected by edges. For example, an image node 514 corresponding to a given pixel 501 in the image 500 is connected to an image node 515 corresponding to a pixel 502 in 4-neighbor around the pixel 501 by an edge 516. The number Nc of connection neighborhoods (the number of graph connection neighborhoods) is determined by taking account of the balance between the accuracy of region extraction and the calculation resources. Generally, however, 4 or 8 is used for a two-dimensional image, and 6 or 26 is used for a three-dimensional image. In addition to edges connecting image nodes, all image nodes in the graph are connected to the two terminal nodes 512 and 513 by edges. For example, an image node 517 in FIG. 5B is connected to the terminal nodes 512 and 513 by edges 518 and 519. Note that some edges are not drawn in FIG. 5B in order to prevent the drawing from being complicated. In the following explanation, an edge to be extended between image nodes will be described as an n-link, and an edge to be connected between an image node and the terminal node will be described as a t-link.

Figure 4C:
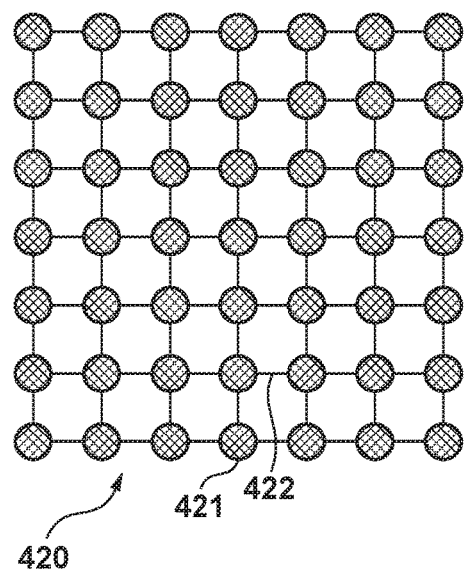

The process in step S308 of this embodiment will be explained with reference to FIGS. 3 and 4A to 4D again. In step S308, the estimator 105 acquires the number Nc of graph connection neighborhoods stored in the storage unit 104. After that, the estimator 105 forms a temporary graph 420 corresponding to the rough extraction image 410 (FIG. 4C). Like the graph of the Graph-Cut method, the temporary graph 420 contains an image node 421 corresponding to each pixel in the rough extraction image 410, an n-link 422 connecting adjacent image nodes, and a t-link (not shown). The n-link 422 is extended between the image node 421 and an image node existing in Nc-neighbor of the image node 421. Also, no t-link is drawn in the temporary graph 420 shown in FIG. 4C for the sake of graphical simplicity, but all image nodes 421 each have two t-links.

Figure 4D:
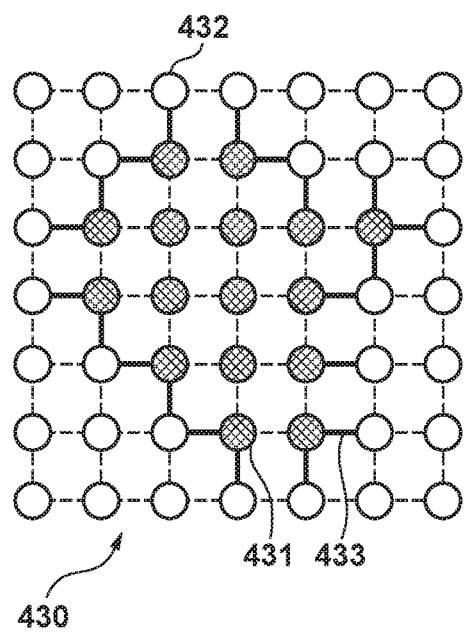

In step S309, of t-links existing in the temporary graph 420, the estimator 105 counts the number $N_t$ of t-links extended to image nodes corresponding to pixels in the rough extraction region 411. The process in step S309 will be explained by using a temporary graph 430 shown in FIG. 4D. In the temporary graph 430, image nodes corresponding to pixels in the rough extraction region 411 of the rough extraction image 410 are indicated by black image nodes 431. Also, image nodes corresponding to pixels in the background region 412 are indicated by white image nodes 432. In the temporary graph 430, image nodes are drawn in different colors for the sake of illustrative simplicity. However, the temporary graph 430 shown in FIG. 4D is actually equal to the temporary graph 420 shown in FIG. 4C. Since a correspondence is determined between the image nodes in the temporary graph 430 and the pixels in the rough extraction image 410, it is possible to easily determine image nodes corresponding to the pixels in the rough extraction region 411 and image nodes corresponding to the pixels in the background region 412.

In step S309, the estimator 105 first counts the number (the number of image nodes) of image nodes 431 corresponding to the rough extraction region 411. Since two t-links exist for one image node, the number $N_t$ of t-links connected to image nodes corresponding to the pixels in the rough extraction region 411 can be obtained by doubling the number of pixels in the rough extraction region 411. Also, the same result is obtained by simply using the number of pixels in the rough extraction region 411 as the value of $N_t$, instead of doubling the number of pixels in the rough extraction region 411. This calculation is equivalent to obtaining the dimension (the area in a two-dimensional image, and the volume in a three-dimensional image) of the rough extraction region 411. Note that as described above, one image node has two t-links in this embodiment. However, there is a case using a graph having more t-links, that is, there is a case using a graph having more than two terminal nodes. Even in a case like this, the process in step S309 can be achieved by counting the number of t-links connected to image nodes corresponding to the pixels in the rough extraction region.

In step S310, the estimator 105 counts the number $N_n$ (the number of connections) of n-links 433 connecting the image nodes 431 corresponding to the pixels in the rough extraction region 411 and the image nodes 432 corresponding to the pixels in the background region 412. FIG. 4D shows the n-links 433 to be counted by thick solid lines. The estimator 105 obtains $N_n$ by the following processing. First, of the pixels in the rough extraction region 411, the estimator 105 specifies pixels where pixels of the background region 412 exist in Nc-neighbor. This specification process can easily be performed because the correspondence is determined between the pixels in the rough extraction image 410 and the image nodes in the temporary graph 430. Then, for each specified pixel, the estimator 105 counts the number of pixels in the background region 412, which exist in Nc-neighbor. The estimator 105 obtains $N_n$ by performing this counting process for all the specified pixels.

In the above-described process, of the pixels in the rough extraction region 411, the number of pixels where pixels in the background region 412 exist in Nc-neighbor can also be used as $N_n$. This is so because it is empirically known that the number of n-links 433 of the image node 431 corresponding to a pixel in a rough extraction region is generally a predetermined multiple of the number Nc of connection neighborhoods. Referring to FIG. 4D, the number of p-links 433 of the image node 431 corresponding to a pixel in the rough extraction region 411 is about two for each image node 431. By using this finding, it is also possible to use the number of pixels in the rough extraction region 411 adjacent to the background region 412 as the value of $N_n$, instead of counting the number of n-links 433 in the temporary graph 430. Note that this calculation corresponds to the calculation of the range (the circumferential length in a two-dimensional image, and the surface area in a three-dimensional image) of the boundary between a rough extraction region and a peripheral region except for the rough extraction region.

Finally, the estimator 105 stores the numerical value $N_t$ obtained in step S309 and the numerical value $N_n$ obtained in step S310 as the region-of-interest dimension information in the storage unit 104, and terminates the process in step S303.

The reference dimension information stored in the data server 110 will now be explained. In this embodiment, the reference dimension information is a group of values having three values ($N^{[Ref]}_n$, $N^{[Ref]}_t$, $\alpha$) as one set. $N^{[Ref]}_n$ and $N^{[Ref]}_t$ are respectively the number of n-links and the number of t-links in the region of interest, which are used as reference values when changing the image size in step S316. The definitions of n-link and t-link are the same as those described in the explanation of steps S309 and S310. $\alpha$ is a coefficient (the Graph-Cut coefficient) by which the smoothing term is multiplied in the energy function (equation 1 presented earlier) of the Graph-Cut method.

A region of interest to be used as a reference when calculating $N^{[Ref]}_n$ and $N^{[Ref]}_t$ is selected in accordance with the type of an image to which this embodiment is applied and the type of the region of interest. When the types of image and region of interest are once determined, a region of interest to be used as a reference can be selected by various methods. The simplest method is to collect several representative images, and select one image containing a region of interest having the most typical shape and dimension, among regions of interest existing in the collected images. If an operator has a priori knowledge about the shape and dimension of a region of interest, the operator can select a region of interest based on the priori knowledge. If an operator has no priori knowledge, the operator can actually extract regions of interest by the well-known segmentation method, form an average region of interest by averaging the extracted regions, and use the formed region as a reference.

The Graph-Cut coefficient $\alpha$ is a coefficient by which the reference region of interest selected by the above-described method can be extracted more accurately by the Graph-Cut method. A coefficient like this is obtained by actually applying the Graph-Cut method to an image containing the reference region of interest. More specifically, the Graph-Cut method is executed a plurality of times while changing the Graph-Cut coefficient, and a Graph-Cut coefficient by which a region of interest can be extracted most accurately is selected. It is also possible to apply the Graph-Cut method to each representative image, determine a Graph-Cut coefficient for each image, and use the average value of a plurality of obtained Graph-Cut coefficients as a final Graph-Cut coefficient.

The reference dimension information ($N^{[Ref]}_n$, $N^{[Ref]}_t$, $\alpha$) is obtained by the abovementioned processing.

The reference dimension information has been explained above.

Next, the process in step S304 of this embodiment will be explained with reference to FIG. 3 again. In step S311, the generator 106 calculates the ratio of the number $N_t$ of t-links obtained in step S309 to the number $N_n$ of n-links obtained in step S310. The generator 106 stores the calculated ratio ($N_t/N_n$) in association with scaling coefficient S=1 in the storage unit 104. When the scaling coefficient S is 1, the original image is not changed, or the size of the original image is maintained.

In steps S312, S313, S314, and S315, the generator 106 calculates a scaling coefficient $S_{Resize}$ (to be referred to as an application scaling coefficient hereinafter) to be applied. In steps S312, S313, S314, and S315, the application scaling coefficient $S_{Resize}$ is so determined as to satisfy the following criterion. That is, the generator 106 generates an image by enlarging or reducing the image size of a rough extraction image in accordance with the scaling coefficient, and acquires dimension information for a rough extraction region drawn in the generated image. The generator 106 compares the dimension information acquired as described above with the reference dimension information acquired from the storage unit 104, and use a scaling coefficient which equalizes the two values as the application scaling coefficient $S_{Resize}$.

Before starting this processing, a set $\{S_1, S_2, \ldots, S_m\}$ of scaling coefficients is determined. m is a natural number except 0. Also, the numerical values in the set are actual values satisfying $0 < S_1 < S_2 < \ldots < S_m < S_{max}$. Furthermore, $S_{max}$ is an actual value larger than 1. It should be noted that this scaling coefficient set need only be determined once when configuring the image processing apparatus 100, and need not be determined whenever an original image is input to the image processing apparatus 100.

The process of determining the application scaling coefficient $S_{Resize}$ in steps S312, S313, S314, and S315 based on the predetermined scaling coefficient set is executed as follows. In step S312, the generator 106 determines whether there is an unused scaling coefficient in the scaling coefficient set. If the determination result is YES, the process advances to step S313, and the generator 106 selects the unused scaling coefficient, and changes the image size of the rough extraction image of the original image by the selected scaling coefficient. A well-known method is used in this image size changing process. The simplest method is a nearest neighbor interpolation method.

The estimator 105 performs the processes in steps S308, S309, and S310 on the rough extraction image after the image size is changed in step S313. Then, the estimator 105 acquires dimension information about the rough extraction region drawn in the rough extraction image after the image size is changed. Let $N^{[k]}_t$ and $N^{[k]}_n$ respectively be the number of t-links and the number of n-links in a temporary graph corresponding to a rough extraction image obtained by a scaling coefficient $S_k$ (k=1, 2, ..., m). In step S311, the generator 106 calculates the ratio ($N^{[k]}_t/N^{[k]}_n$) of $N^{[k]}_t$ to $N^{[k]}_n$, and stores the calculated ratio in association with the scaling coefficient $S_k$ in the storage unit 104.

When this ratio is calculated for all scaling coefficients contained in the scaling coefficient set $\{S_1, S_2, \ldots, S_m\}$ in step S311, the generator 106 determines in step S312 that there is no more unused scaling coefficient. In step S314, the generator 106 compares the ratio corresponding to the scaling coefficient $S_k$ with the ratio obtained from the reference dimension information. Then, the generator 106 acquires the reference dimension information from the storage unit 104, and calculates the ratio ($N^{[Ref]}_t/N^{[Ref]}_n$) of $N^{[Ref]}_t$ to $N^{[Ref]}_n$ contained in the acquired dimension information. Subsequently, for each scaling coefficient contained in the scaling coefficient set $\{S_1, S_2, \ldots, S_m\}$, the generator 106 calculates a difference between the ratio corresponding to the scaling coefficient and the reference ratio ($N^{[Ref]}_t/N^{[Ref]}_n$).

In step S315, the generator 106 determines the application scaling coefficient $S_{Resize}$. The generator 106 determines a scaling coefficient which minimizes the difference obtained in step S314, as the application scaling coefficient $S_{Resize}$.

Note that various methods can be used to determine $S_{max}$. The simplest method is to set a given fixed value by the configurer or user of the image processing apparatus 100 according to this embodiment. Another method is to determine $S_{max}$ from a plurality of representative images collected when determining the reference dimension information. More specifically, the above-described scaling coefficient determining method is applied to each image containing no region of interest as a reference, of the plurality of representative images. In this method, a provisionally determined scaling coefficient set is used. The value of this provisionally determined scaling coefficient set need only be manually adjusted so as to appropriately determine a scaling coefficient for each image.

In step S316, the generator 106 changes the image size of the original image based on the application scaling coefficient $S_{Resize}$ obtained in step S315, thereby generating a size-changed image. The image size is changed by using a well-known method. More specifically, it is possible to use well-known interpolation methods such as nearest neighbor interpolation, linear interpolation, and cubic interpolation. Finally, the generator 106 stores the size-changed image generated in step S316 in the storage unit 104, and terminates the process in step S304.

Figure 8:
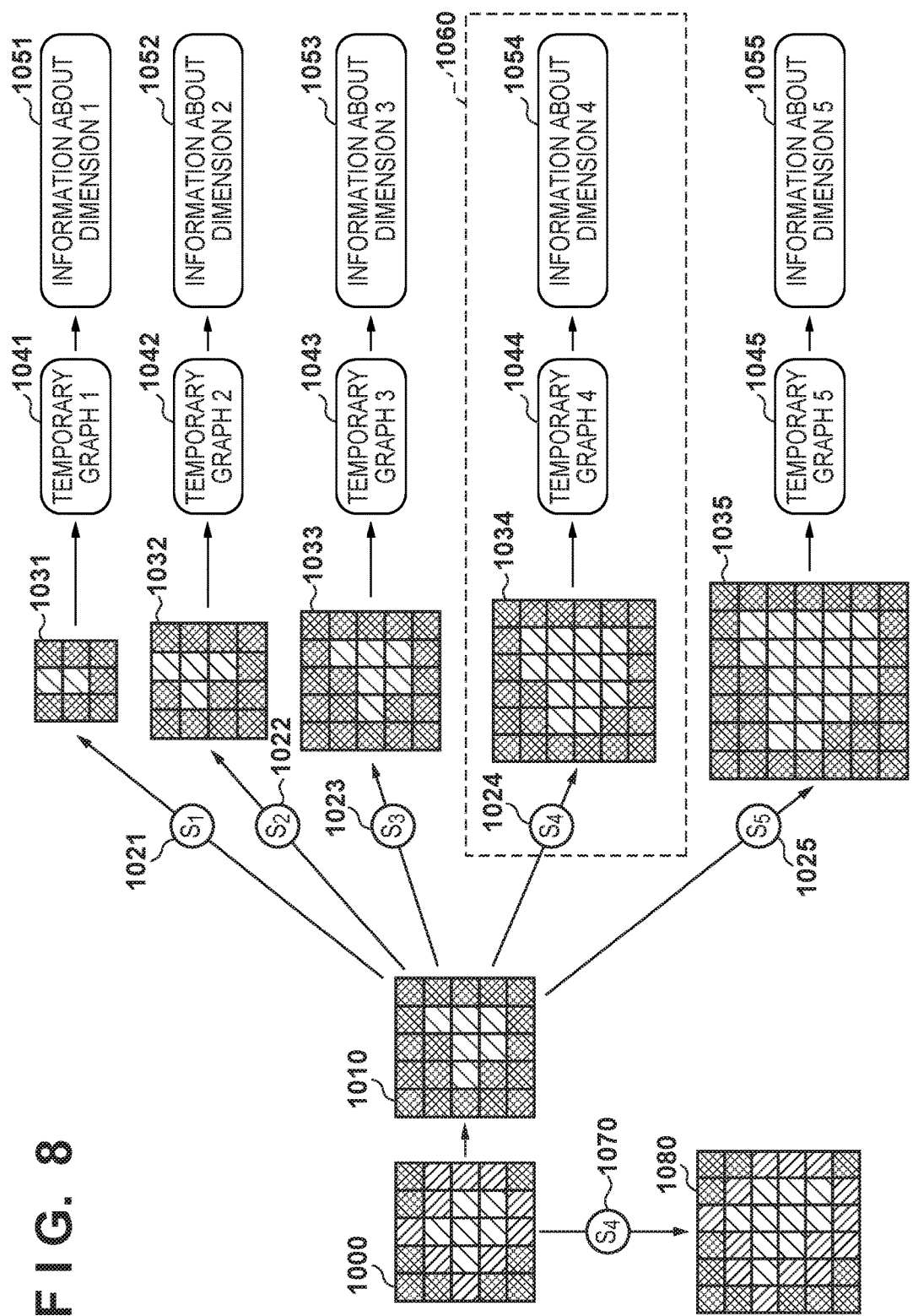
FIG. 8 is a schematic view for explaining a process of generating a second image from a first image in the image processing apparatus according to the first embodiment.

As has been explained above, the image processing apparatus 100 according to the first embodiment repetitively executes steps S303 and S304. To better understand this repetitive processing of steps S303 and S304, the processing will comprehensively be explained with reference to FIG. 8. FIG. 8 shows data such as the images, temporary graphs, and dimension information generated in steps S303 and S304, that is, in steps S307, S308, S309, S310, S311, S312, S313, S314, S315, and S316. In step S307, a first rough extraction image 1010 is generated by applying the segmentation method different from the Graph-Cut method to an original image (first image) 1000. Then, in the repetitive execution of steps S312 and S313, the size of the first rough extraction image 1010 is changed by using a plurality of coefficients $S_1$ (1021), $S_2$ (1022), $S_3$ (1023), $S_4$ (1024), and $S_5$ (1025) (scaling coefficients in the first embodiment), thereby generating a plurality of second rough extraction images 1031, 1032, 1033, 1034, and 1035. The second rough extraction images are generated by using the five different coefficients in FIG. 8, but the number of coefficients is not limited to this. Note that generating a second rough extraction image from a first rough extraction image by using a given coefficient, or the coefficient itself, will be called a change rule. In the repetitive execution of step S308, temporary graphs 1 (1041), 2 (1042), 3 (1043), 4 (1044), and 5 (1045) corresponding to the plurality of second rough extraction images 1031, 1032, 1033, 1034, and 1035 are generated therefrom. Furthermore, in the repetitive execution of steps S309 and S310, pieces of dimension information 1 (1051), 2 (1052), 3 (1053), 4 (1054), and 5 (1055) (each information is represented by information about dimension in FIG. 8) are acquired. In steps S311, S314, and S315, a second rough extraction image is selected by comparing each dimension information with reference information (not shown). Referring to FIG. 8, the broken lines 1060 indicate that the second rough extraction image 1034 is selected. After the second rough extraction image 1034 is selected, the process advances to step S316, and the change rule ($S_4$ (1024) in FIG. 8) used when generating the second rough extraction image 1034 is applied to the original image (first image) 1000, thereby generating a size-changed image (second image) 1080. A change rule $S_4$ (1070) shown in FIG. 8 is the same change rule as $S_4$ (1024). In steps S303 and S304 as described above, the dimension information 4 (1054) (represented by the information about dimension 4 in FIG. 8) of the selected second rough extraction image 1034 is used (estimated) as the dimension information of a region of interest in the size-changed image (second image) 1080. Based on the estimated information, the size-changed image (second image) 1080 is actually generated.

In the image processing apparatus 100 according to this embodiment, the information about the dimension of a region of interest, and the information about the range of the boundary between the region of interest and its peripheral region, are respectively automatically acquired from an image in the form of the number of t-links and the number of n-links. Then, the image processing apparatus 100 changes the image size based on the acquired information, and applies the Graph-Cut method to the size-changed image. The Graph-Cut coefficient α used when executing the Graph-Cut method is suitable for extracting a reference region of interest having the same dimension as that of a region of interest drawn in the size-changed image. Accordingly, the Graph-Cut coefficient α is also suitable for the region of interest drawn in the size-changed image. Even when the shape and dimension of a region of interest change in accordance with an image, therefore, the Graph-Cut method can be executed by automatically taking account of the shape and dimension of the region of interest without applying any load on the operator.

Modification 1-1

The point of the image processing apparatus 100 according to the first embodiment is to determine a scaling coefficient based on the information about the dimension of a region of interest and the range of the boundary between the region of interest and its peripheral region, and change the image size of an original image. If there is a priori knowledge about the shape and dimension of a region of interest, the same effect as that of the image processing apparatus 100 according to the first embodiment can be obtained by simpler processing. One example is a case in which a region of interest has a circular shape (in the case of a two-dimensional image), a spherical shape (in the case of a three-dimensional image), or a shape close to the circle or sphere (for example, an ellipse or ellipsoid).

This modification will be explained below by limiting the explanation to differences from the processing of the image processing apparatus 100 according to the first embodiment. In this modification, the estimator 105 acquires a rough dimension (the radius of a circle or sphere) of a region of interest of an original image by using a LoG (Laplacian of Gaussian) filter, instead of roughly extracting the region of interest in step S307 of the first embodiment. Since it is assumed that a region of interest has a shape close to a circle or sphere in this modification, a process of estimating the dimension (radius) of a massive structure by using the LoG filter is applicable. This estimation process using the LoG filter is a well-known technique, so a detailed explanation thereof will be omitted. Let R be the rough radius of the region of interest obtained by this estimation process. The estimator 105 performs no processing in steps S308, S309, and S310, or skips these steps. The value R acquired by the abovementioned estimation process is stored in the storage unit 104.

Before step S304, the generator 106 acquires a radius $R^{[Ref]}$ of the reference region of interest, as reference dimension information, from the data server 110 via the storage unit 104. In step S304, the generator 106 calculates the application scaling coefficient $S_{Resize}$ by $S_{Resize}=R/R^{[Ref]}$. After that, the same processes as those of the image processing apparatus 100 are performed in steps S316 and S305.

In the above explanation, it is assumed that a region of interest has a circular shape (in the case of a two-dimensional image), a spherical shape (in the case of a three-dimensional image), or a shape close to the circle or sphere (for example, an ellipse or ellipsoid). However, the application range of this modification is not limited to these shapes. This modification uses the condition that a region of interest existing in an original image and the reference region of interest nearly have a similarity relation (when the region of interest is enlarged or reduced and overlapped on the reference region of interest, the two regions nearly overlap each other). Therefore, this modification is applicable if a region of interest has a similarity relation. For example, this modification is applicable even when a region of interest has a polygonal shape such as a triangle or quadrangle (in the case of a two-dimensional image) or a columnar shape such as a triangular pyramid or triangular prism (in the case of a three-dimensional image). Furthermore, since a region of interest need only be the same kind of object having a similar shape, this modification is applicable to an image of an organ such as a liver extracted in an X-ray CT image. When using any of these regions of interest, it is difficult to define the radius of the region of interest. Instead, however, the dimension or the like of a minimum rectangle (a so-called bounding box, MBR) surrounding the region of interest can be used as the dimension information.

The above-described method makes it possible to execute the Graph-Cut method, even when the dimension of a region of interest changes in accordance with an image, by automatically taking account of the dimension of the region of interest without applying any load on the operator of the image processing apparatus.

Modification 1-2

The image processing apparatus 100 according to the first embodiment uses a set of reference dimension information. However, it is also possible to use a plurality of sets of reference dimension information. In this case, a plurality of sets of reference dimension information as follows are stored in the data server 110. N is a natural number of two or more.

$$\left(N_n^{[Ref1]}, N_t^{[Ref1]}, \alpha_1\right)$$
$$\left(N_n^{[Ref2]}, N_t^{[Ref2]}, \alpha_2\right)$$
$$\ldots$$
$$\left(N_n^{[RefN]}, N_t^{[RefN]}, \alpha_N\right)$$

In step S304, the image processing apparatus according to this modification changes the image size of a rough extraction image while changing the scaling coefficient. Then, the image processing apparatus calculates $N_t^{[k]}$ and $N_n^{[k]}$ for the rough extraction image having the changed image size. Whenever calculating $N_t^{[k]}$ and $N_n^{[k]}$, the image processing apparatus sequentially compares $N^{[k]}/N[k]_n$ with $N^{[Ref1]}_t/N^{[Ref1]}_n$, $N^{[Ref2]}_t/N^{[Ref2]}_n$, $N^{[RefN]}_t/N^{[RefN]}_n$. The image processing apparatus executes this comparison by using all scaling coefficients, and acquires a scaling coefficient which makes the two values closest, as the application scaling coefficient $S_{Resize}$. The image processing apparatus also acquires a set of reference dimension information as a comparison target. As in the first embodiment, the application scaling coefficient $S_{Resize}$ acquired by this comparison is used in step S316. On the other hand, a set of reference dimension information (selected reference dimension information) as a comparison target is stored in the storage unit 104 as it is different from a plurality of sets of reference dimension information acquired from the data server 110. A Graph-Cut coefficient $\alpha_i$ ($1<=i<=N$) contained in the selected reference dimension information is used when performing the Graph-Cut method in step S305 of this modification.

A plurality of sets of reference dimension information prestored in the data server 110 are acquired from a plurality of reference regions of interest. The plurality of reference regions of interest can be selected by various methods. The simplest method is to collect several representative images, and select a plurality of images each containing a region of interest having a typical shape or dimension among regions of interest existing in the collected images. When selecting images, the number $N_t^{[Ref]}$ of t-links and the number $N_n^{[Ref]}$ of n-links in a region of interest can be used as selection criteria. More specifically, $N_t^{[Ref]}/N_n^{[Ref]}$ is calculated for each collected image. Then, an image combination which maximizes the difference between the values of the ratios is selected. This combination selecting process can be implemented by calculating the sum of $N_t^{[Ref]}/N_n^{[Ref]}$ for all possible combinations, and selecting a combination which maximizes the sum.

The above method makes it possible to automatically set a Graph-Cut coefficient suitable for extraction of a region of interest, even when the shape or dimension of the region of interest largely changes from one image to another. As a consequence, the Graph-Cut method can be executed without applying any load on the operator of the image processing apparatus.

Second Embodiment

The image processing apparatus 100 according to the first embodiment uses information about the dimension of a region of interest and the range of the boundary between the region of interest and its peripheral region, as the dimension information of the region of interest. On the other hand, an image processing apparatus according to the second embodiment uses information about the dimension of a region of interest and the dimension of a region other than the region of interest, as dimension information.

Figure 6:
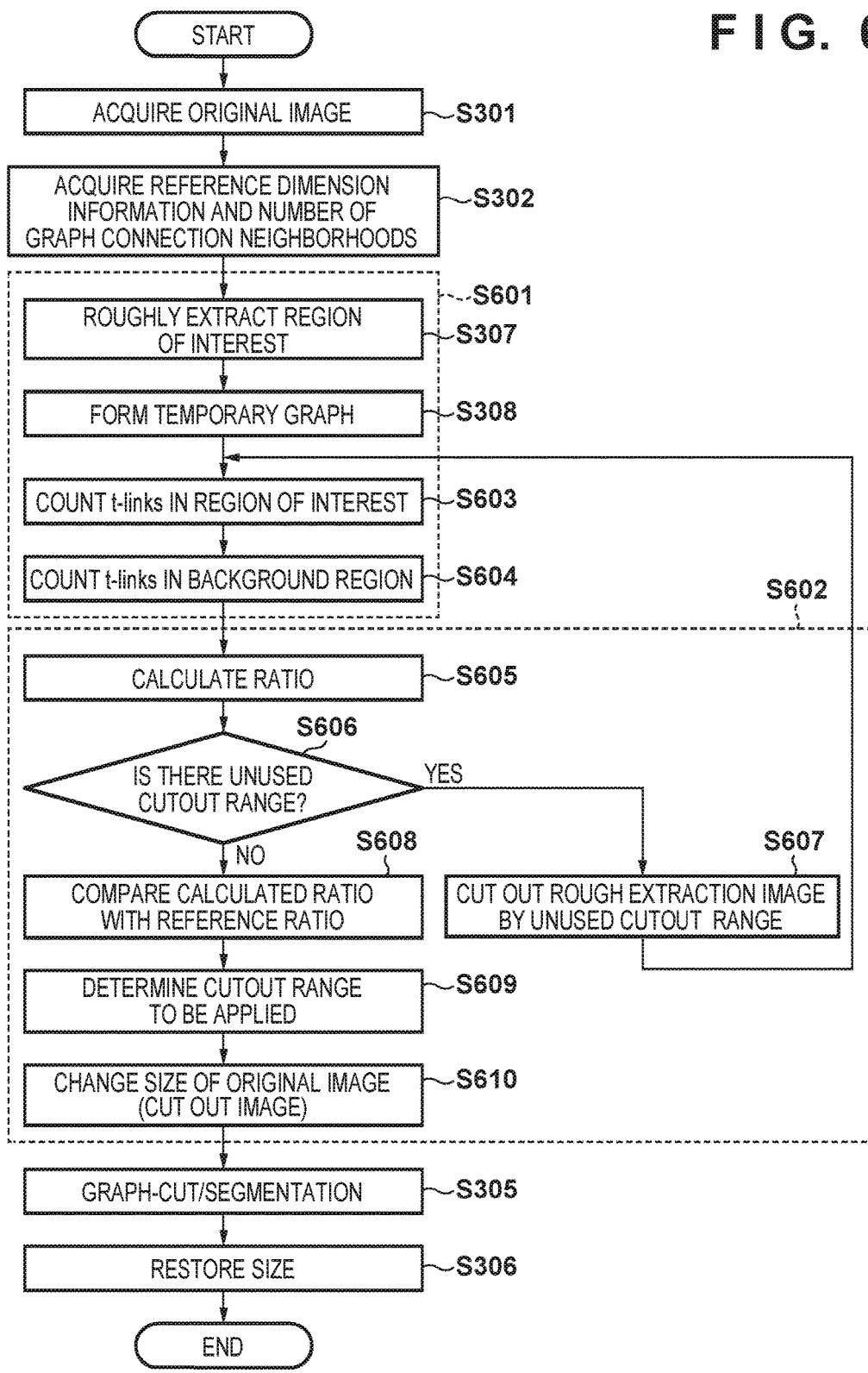
FIG. 6 is a flowchart showing the procedure of an image processing apparatus according to the second embodiment.

The image processing apparatus according to the second embodiment will be explained below. The functional configuration of the image processing apparatus according to this embodiment is the same as that of the image processing apparatus 100 according to the first embodiment. The procedure of the image processing apparatus according to this embodiment will be explained below with reference to FIG. 6. The image processing apparatus according to this embodiment executes steps equal to steps S301, S302, S305, and S306 executed by the image processing apparatus 100 according to the first embodiment. The image processing apparatus according to this embodiment executes steps S601 and S602 corresponding to but different from steps S303 and S304 executed by the image processing apparatus 100 according to the first embodiment.

Processing performed in step S601 will be explained. In step S601, processes in steps equal to steps S307 and S308 of the first embodiment are performed.

Figure 7A:
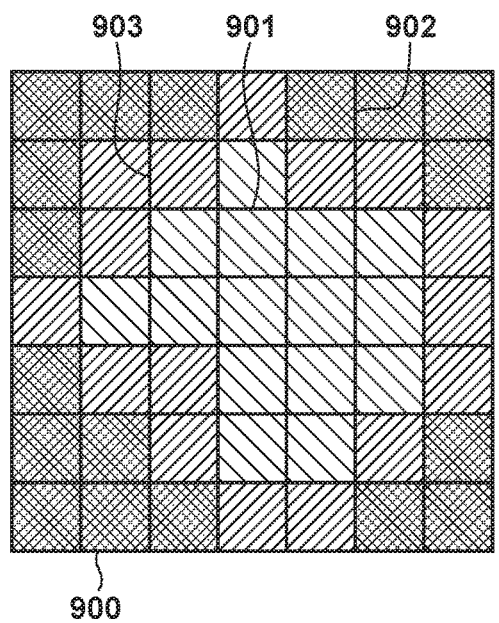
FIGS. 7A, 7B, 7C, and 7D are schematic views for explaining processing of the image processing apparatus according to the second embodiment.
Figure 7B:
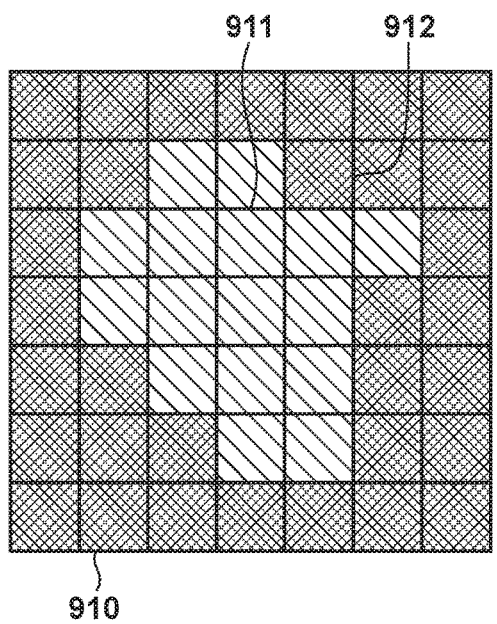
Figure 7C:
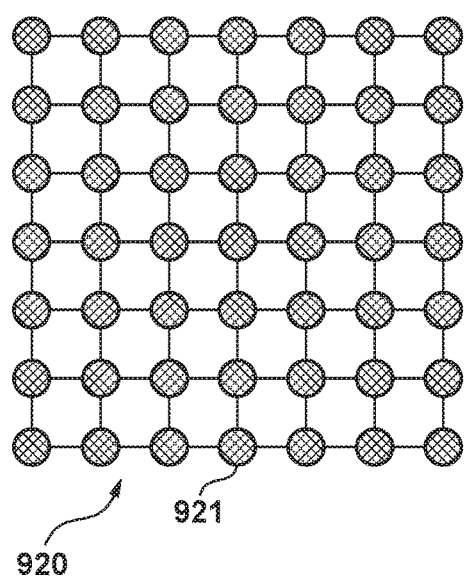
Figure 7D:
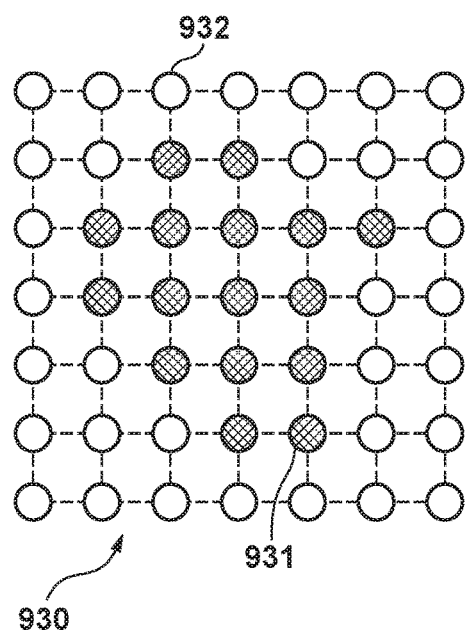

FIGS. 7A to 7D show an outline of the processing performed in step S601 by the image processing apparatus according to this embodiment. An original image 900 shown in FIG. 7A is an image obtained by an estimator 105 from a data server 110 via a storage unit 104. The original image 900 is a gray-scale image. In the original image 900, a region of interest 901, other regions 902, and intermediate regions 903 between them are drawn. A rough extraction image 910 shown in FIG. 7B is an image obtained by processing the original image 900 in step S307. The rough extraction image 910 contains a rough extraction region 911 and a background region 912. A temporary graph 920 shown in FIG. 7C is a graph obtained by processing the rough extraction image 910 in step S308. Image nodes 921 are image nodes corresponding to pixels in the rough extraction image 910. A temporary graph 930 shown in FIG. 7D is the same as the temporary graph 920. For the sake of easy understanding of the explanation of the following processing steps, however, image nodes 931 corresponding to pixels in the rough extraction region 911 are drawn by a dark color, and image nodes 932 corresponding to pixels in the background region 912 by white. No t-links are drawn in the temporary graphs 920 and 930 for the sake of graphical simplicity of the drawings, but all image nodes shown in these graphs each have two t-links.

Referring to FIG. 6 again, in step S603, the estimator 105 counts the number $N_{FG}$ of t-links connected to the image nodes 931 corresponding to the pixels in the rough extraction region 911. A correspondence exists between the pixels in the rough extraction region 910 and the image nodes in the temporary graph 930, so it is possible to easily specify the image nodes 931 corresponding to the pixels in the rough extraction region 911. Since two t-links exist for one image node, the number $N_{FG}$ of t-links connected to the image nodes corresponding to the pixels in the rough extraction region is twice the number of pixels in the rough extraction region. Note that the number of t-links of one image node is essentially two as described above. However, a graph having more t-links is sometimes used, that is, a graph having more than two terminal nodes is sometimes used. Even in a case like this, the process in step S603 can be achieved by counting the number of t-links connected to image nodes corresponding to pixels in a rough extraction region.

In step S604, the estimator 105 counts the number $N_{BG}$ of t-links connected to the image nodes 932 corresponding to the pixels in the background region 912. This process in step S604 is performed following the same procedure as in step S603, so an explanation thereof will be omitted. Finally, the estimator 105 stores the two values $N_{FG}$ and $N_{BG}$ acquired in steps S603 and S604 in the storage unit 104 as dimension information of the region of interest, and terminates the process in step S601.

The reference dimension information stored in the data server 110 will be explained below. In this embodiment, the reference dimension information is a group of values having three values ($N^{[Ref]}_{FG}$, $N^{[Ref]}_{BG}$, a) as a set. $N^{[Ref]}_{FG}$ and $N^{[Ref]}_{BG}$ are respectively the number of t-links in a reference region of interest, and the number of t-links in a region (background region) other than the region of interest. The definition of the number of t-links in the reference region of interest is the same as that described in the explanation of steps S603 and S604. These values are used when changing the image size in step S610. α is a Graph-Cut coefficient by which the smoothing term is multiplied in the energy function (equation 1 presented earlier) of the Graph-Cut method. Methods of determining the reference region of interest and the Graph-Cut coefficient are the same as described in the explanation of the first embodiment.

The process performed in step S602 will be explained. In step S602, a generator 106 sets an image cutout range, and cuts out an image in the set range from the original image. The cutout range can be expressed in various forms. In this embodiment, a cutout range TR is expressed by a rectangular region having coordinates ($C_x$, $C_y$, $C_z$) as a center and a length ($L_x$, $L_y$, $L_z$) on each side.

In step S605, the generator 106 calculates the ratio of the number $N_{FG}$ of t-links in the region of interest obtained in step S603 to the number $N_{BG}$ of t-links in the background region obtained in step S604. The generator 106 stores the calculated ratio ($N_{BG}/N_{FG}$) in association with a case in which no image is cut out (cutout range=whole original image) in the storage unit 104.

In steps S606, S607, S608, and S609, the generator 106 calculates a cutout range $TR_{Resize}$ to be applied (to be referred to as an application cutout range). In steps S606, S607, S608, and S609, the center coordinates ($C_x$, $C_y$, $C_z$) of the cutout range TR (a rectangular range) and the length ($L_x$, $L_y$, $L_z$) of each side of the rectangular region are so determined as to satisfy the following criterion. That is, the generator 106 calculates the ratio of the number of t-links of a rough extraction region to that of a background region in an image obtained by cutting out the set rectangular region from the rough extraction image. The generator 106 compares the calculated ratio with the ratio of the number of t-links of the reference region of interest to that of the background region, and sets a cutout range within which the two values match as an application cutout range.

Before performing this processing, three values $L_{min}$, $L_{max}$, and M are determined. $L_{min}$ and $L_{max}$ satisfy $0<L_{min}<L_{max}$, and M is a natural number except 0. A set $\{TR_1, TR_2, \ldots, TR_M\}$ of the cutout range is determined as follows based on these three numerical values. The length ($L_{xl}$, $L_{yl}$, $L_{zl}$) of each side of the lth cutout range $TR_l$ (l=0, 1, . . . , M) is calculated by $L_{xl}=L_{yl}=L_{xl}=L_{min}+l\times(L_{max}-L_{min})/M$. The center coordinates ($C_x$, $C_y$, $C_z$) are common to all cutout ranges in the set.

By referring to the set of the cutout ranges determined as described above, steps S606, S607, S608, and S609 are executed following the procedure below. In step S606, the generator 106 determines whether there is an unused cutout range in the set of the cutout ranges. If the determination result is YES, the process advances to step S607, and the generator 106 selects one unused cutout range, and cuts out an image in the selected cutout range from the rough extraction image of the original image.

The estimator 105 performs the processes in steps S603 and S604 on the rough extraction image cut out in step S607. Let $N^{[l]}_{FG}$ and $N^{[l]}_{BG}$ respectively be the number of t-links in the region of interest corresponding to the rough extraction image cut out by the cutout range $TR_l$, and the number of t-links in the background region. In step S605, the generator 106 calculates the ratio ($N^{[l]}_{BG}/N^{[l]}_{FG}$) of $N^{[l]}_{BG}$ to $N^{[l]}_{FG}$, and stores the calculated ratio in association with the cutout range $TR_l$ in the storage unit 104.

After calculating the ratios in step S605 for all the cutout ranges contained in the cutout range set $\{TR_1, TR_2, \ldots, TR_M\}$, the generator 106 determines in step S606 that there is no more unused cutout range. In step S608, the generator 106 compares the ratio corresponding to the cutout range with the ratio obtained from the reference dimension information. The generator 106 acquires the reference dimension information from the storage unit 104, and calculates the ratio ($N^{[Ref]}_{BG}/N^{[Ref]}_{FG}$) of $N^{[Ref]}_{BG}$ to $N^{[Ref]}_{FG}$ contained in the acquired dimension information. For each cutout range contained in the cutout range set $\{TR_1, TR_2, \ldots, TR_M\}$, the generator 106 calculates the difference between the ratio corresponding to the cutout range and the reference ratio ($N^{[Ref]}_{BG}/N^{[Ref]}_{FG}$).

In step S609, the generator 106 determines the application cutout range $TR_{Resize}$. More specifically, the generator 106 determines a cutout range which minimizes the difference obtained in step S608 as the application cutout range $TR_{Resize}$.

Various methods can be used to determine the three values $L_{min}$, $L_{max}$, and M. The simplest method is to set a given fixed value by the configurer or user of the image processing apparatus according to this embodiment. Another method is to determine the values from a plurality of representative images collected when determining the reference dimension information. More specifically, the above-described method of determining the rectangular region is applied for each image not containing a reference region of interest, among the plurality of representative images. This method uses provisionally determined $L_{min}$, $L_{max}$, and M. The values of provisionally determined $L_{min}$, $L_{max}$, and M need only be manually adjusted so that rectangular regions can properly be determined for all images.

Note that the rectangular region determined by the method described above sometimes extends outside the rough extraction image. More specifically, this is a case in which, when letting $B_x$ be the number of pixels in the X-axis direction of the rough extraction image, $C_x+L_{x1}<1$ or $B_x<C_x+L_{x1}$ holds. Note that this similarly applies to the Y-axis direction and Z-axis direction. Several methods can be used to cope with a situation like this. One method is to regard the extended region as invalid. In this method, an image generated by the cutting process is limited to the image size of the rough extraction image. Another method is to perform the cutting process by assuming that a pixel belonging to the background region exists outside the rough extraction image.

In step S610, the generator 106 cuts out an image based on the application cutout range $TR_{Resize}$ determined in step S609. More specifically, the generator 106 generates a rectangular region corresponding to the application cutout range $TR_{Resize}$ in the original image as a new image (size-changed image). Finally, the generator 106 stores the generated size-changed image in the storage unit 104, and terminates the process in step S602.

Note that the rectangular region defined by the application cutout range $TR_{Resize}$ sometimes extends outside the original image. More specifically, this is a case in which, when letting $I_x$ be the number of pixels in the X-axis direction of the original image, $C_x+L_{xResize}<1$ or $I_x<C_x+L_{xResize}$ holds. This similarly applies to the Y-axis direction and Z-axis direction. Several methods can be used to cope with a situation like this. One method is to regard the extended region as invalid. In this method, an image generated by the cutting process is limited to the image size of the original image. Another method is to perform the cutting process by assuming that a virtual pixel exists outside the original image. In this method, the pixel value of the virtual pixel is the pixel value of a pixel closest to the virtual pixel, among pixels in the original image.

As has been explained above, the image processing apparatus according to the second embodiment repetitively executes steps S601 and S602 (that is, steps S307, S308, S603, S604, S605, S606, S607, S608, S609, and S610). In step S307, a first rough extraction image is initially generated by applying the segmentation method different from the Graph-Cut method to an original image (first image). Then, in the repetitive execution of steps S606 and S607, the size of the first rough extraction image is changed by using a plurality of different coefficients (cutout ranges TR), thereby generating a plurality of second rough extraction images. In the image processing apparatus according to the second embodiment, generating a new rough extraction image (second rough extraction image) by cutting out a portion (changing the size) of the rough extraction image (first rough extraction image) by using the coefficient (cutout range TR), or the coefficient itself, is a change rule. In the repetitive execution of step S308, temporary graphs corresponding to the plurality of second rough extraction images are generated. In addition, a plurality of pieces of dimension information are acquired in the repetitive execution of steps S603 and S604. In steps S605, S608, and S609, the second rough extraction image is selected by comparing each dimension information with reference information. After the second rough extraction image is selected, a size-changed image (second image) is generated in step S610 by applying the change rule used when generating the selected second rough extraction image to the original image (first image). In steps S601 and S602 as described above, the dimension information of the selected second rough extraction image is used (estimated) as dimension information of a region of interest in the size-changed image (second image). Then, the size-changed image (second image) is actually generated based on the estimated information.

The image processing apparatus according to this embodiment automatically acquires information about the dimension of a region of interest and the dimension of a region other than the region of interest, in the form of the number of t-links. Then, the image processing apparatus 100 changes the image size based on the acquired information, and applies the Graph-Cut method to the size-changed image. The Graph-Cut coefficient $\alpha$ used when executing the Graph-Cut method is suitable for extracting a reference region of interest having the same dimension as that of the region of interest drawn in the size-changed image. This Graph-Cut coefficient $\alpha$ is suitable for the region of interest drawn in the size-changed image. Even when the shape or dimension of a region of interest changes in accordance with an image, therefore, the Graph-Cut method can be executed by automatically taking account of the shape or dimension of the region of interest, without applying any load on the operator.

The arrangements and operations of the image processing apparatuses according to the embodiments have been explained above. It is to be understood by those skilled in the art that these embodiments are examples, various modifications can be made for combinations of the constituent elements and processes, and these modifications fall within the range of this disclosure.

The segmentation result obtained by the above-described image processing apparatus is output from the image processing apparatus 100 to the monitor 205 connected to (or included in) the image processing apparatus, and displayed on the monitor 205. For example, the image processing apparatus 100 generates a display image by superposing, on an original image acquired by the image acquisition unit 101, lines surrounding a region of the original image, which is obtained as a result of the segmentation process and corresponds to a region of interest, and displays the display image on the monitor 205.

The image processing apparatus 100 can also implement the same function by an image processing system including a plurality of information processing apparatuses (for example, an information processing apparatus having the hardware configuration shown in FIG. 2) connected across a network. In this image processing system, the estimator 105, generator 106, and extractor 107 pertaining to the image processing can be included in one information processing apparatus, and the rest of the configuration (the image acquisition unit 102, parameter acquisition unit 103, and storage unit 104) can be included in another information processing apparatus.

As an example of each information processing apparatus, an information processing apparatus (first information processing apparatus) for executing the function of the image processor 101 includes the hardware shown in FIG. 2, a communication circuit (not shown in FIG. 2) such as a NIC (Network Interface Card), and a program stored in the magnetic disk 203. The CPU 201 expands the program on the main memory 202 and executes commands contained in the program, thereby executing the processes in steps S303 to S306. The processes in steps S301 and S302 are performed by, for example, a second information processing apparatus different from the first information processing apparatus. The second information processing apparatus also includes the hardware shown in FIG. 2, a communication circuit (not shown in FIG. 2) such as a NIC (Network Interface Card), and the magnetic disk 203. The CPU 201 expands the program on the main memory 202 and executes commands contained in the program, thereby performing the processes in steps S301 and S302. The CPU 201 causes the communication circuit to transmit an image and parameter obtained by the processes to the first information processing apparatus.

Furthermore, it is also possible to provide a plurality of above-described second information processing apparatuses as terminals in one-to-one correspondence with users or hospitals, and provide a common first information processing apparatus for executing the function of the image processor 101 (the estimator 105, generator 106, and extractor 107) to the plurality of terminals. In another example, the units of the image processor 101 (the estimator 105, generator 106, and extractor 107) can be included in different information processing apparatuses. Also, a plurality of information processing apparatuses included in the image processing system need not exist in the same facility or country.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-043929, filed Mar. 7, 2016, which is hereby incorporated by reference herein in its entirety.

What is claimed is:

1. An image processing apparatus, comprising:
   a memory storing a program; and
   one or more processors which, by executing the program, function as:
   acquiring unit configured to acquire, as a reference information, information including information about a dimension of a reference region of interest and a Graph-Cut coefficient corresponding to the information about the dimension;
   generating unit configured to generate a second image based on a first image with a first region of interest such that a second region of interest in the second image corresponding to the first region of interest satisfies a predetermined criterion with respect to the information about the dimension; and
   extracting unit configured to extract the second region of interest from the second image generated by the generating unit, by applying a Graph-Cut method using the Graph-Cut coefficient to the second image.

2. The apparatus according to claim 1, wherein the one or more processors further function as an estimating unit configured to estimate information about the dimension of the second region of interest in the second image,
   wherein the generating unit generates the second image, so that the information estimated by the estimating unit satisfies the predetermined criterion.

3. The apparatus according to claim 1, wherein the second image generated by the generating unit is generated by enlarging or reducing the first image.

4. The apparatus according to claim 1, wherein the second image generated by the generating unit is generated by cutting out the second image from the first image.

5. The apparatus according to claim 1, wherein the Graph-Cut coefficient is a coefficient representing weighting of an energy function of the Graph-Cut method.

6. The apparatus according to claim 2, wherein the estimating unit generates a first rough extraction image by applying a segmentation method different from the Graph-Cut method to the first image, and estimates the information about the dimension of the second region of interest in the second image from a second rough extraction image obtained by changing a size of the generated first rough extraction image.

7. The apparatus according to claim 2, wherein the information about the dimension of the second region of interest in the second image contains an amount defined by the dimension of second the region of interest, and a range of a boundary between the second region of interest and a peripheral region thereof, and information on a dimension of the region of interest forming the reference information contains an amount defined by a dimension of a predetermined reference region of interest, and a range of a boundary between the reference region of interest and a peripheral region thereof.

8. The apparatus according to claim 2, wherein the information about the dimension of the second region of interest in the second image contains an amount defined by the dimension of the second region of interest, and a dimension of a region other than the second region of interest, and information on a dimension of the reference region of interest forming the reference information contains an amount defined by a dimension of the reference region of interest, and a dimension of a region other than the reference region of interest.

9. The apparatus according to claim 6, wherein the generating unit generates the second image by applying, to the first image, a change rule for changing the first rough extraction image to the second rough extraction image, which is determined such that the information estimated by the estimating unit satisfies the predetermined criterion.

10. The apparatus according to claim 6, wherein the estimating unit forms a graph of from the second rough extraction image based on the Graph-Cut method, the information about the dimension of the second region of interest in the second image contains the number of image nodes in the graph, which correspond to pixels in a second rough extraction region in the second rough extraction image, which corresponds to a first rough extraction region extracted as a region of interest from the first rough extraction image, and the number of connections between the pixels in the second rough extraction region and pixels adjacent to the second rough extraction region, and information on a dimension of the region of interest forming the reference information contains a predetermined number of image nodes, and a predetermined number of connections.

11. The apparatus according to claim 6, wherein the estimating unit forms a graph from the second rough extraction image based on the Graph-Cut method, the information about the dimension of the second region of interest in the second image contains the number of image nodes in the graph corresponding to pixels in a second rough extraction region of the second rough extraction image, which corresponds to a first rough extraction region extracted as a region of interest from the first rough extraction image, and the number of image nodes in the graph corresponding to pixels in a region other than the second rough extraction region in the second rough extraction image, and information on a dimension of the reference region of interest forming the reference information contains a number of first nodes corresponding to the reference region of interest, and a predetermined number of second nodes corresponding to a region other than the reference region of interest.

12. The apparatus according to claim 6, wherein the information about the dimension of the second region of interest in the second image contains an amount defined by the dimension of the second region of interest, and a range of a boundary between the second region of interest and a peripheral region thereof, and information on a dimension of the reference region of interest forming the reference information contains an amount defined by a dimension of the reference region of interest, and a range of a boundary between the reference region of interest and a peripheral region thereof.

13. The apparatus according to claim 9, wherein the generating unit generates a plurality of second rough extraction images by changing the size of the first rough extraction image by using a plurality of different scaling coefficients, selects, from the plurality of second rough extraction images, a second rough extraction image satisfying the predetermined criterion, and sets a scaling coefficient applied to the selected second rough extraction image as the change rule.

14. An image processing method, comprising:
acquiring reference information including information about a dimension of a reference region of interest and a Graph-Cut coefficient corresponding to the information about the dimension of the reference region of interest;
generating a second image based on a first image with a first region of interest such that a second region of interest in the second image corresponding to the first region of interest satisfies a predetermined criterion with respect to the information about the dimension; and
extracting the second region of interest from the second image, by applying a Graph-Cut method using the Graph-Cut coefficient to the generated second image.

15. A non-transitory computer-readable storage medium storing a computer program for causing a computer to execute an image processing method, the image processing method comprising:
acquiring reference information including information about a dimension of a reference region of interest and a Graph-Cut coefficient corresponding to the information about the dimension of the reference region of interest;
generating a second image based on a first image with a first region of interest such that a second region of interest in the second image corresponding to the first region of interest satisfies a predetermined criterion with respect to the information about the dimension; and
extracting the second region of interest from the second image, by applying a Graph-Cut method using a Graph-Cut coefficient to the generated second image.

* * * * *